United States Patent [15] 3,656,463
Kranc [45] Apr. 18, 1972

[54] PURGING VOLATILES FROM GASOLINE STREAM

[72] Inventor: Marion F. Kranc, Bethel Park, Pa.
[73] Assignee: Pittsburgh Activated Carbon Company, Pittsburgh, Pa.
[22] Filed: Feb. 13, 1970
[21] Appl. No.: 11,276

Related U.S. Application Data

[60] Continuation-in-part of Ser. No. 632,626, Apr. 21, 1967, abandoned, Division of Ser. No. 655,973, June 8, 1967, abandoned.

[52] U.S. Cl. .................................................... 123/136, 123/121
[51] Int. Cl. ............................................................ F02m 19/00
[58] Field of Search ............................................................ 123/136

[56] References Cited

UNITED STATES PATENTS 3,221,724  12/1965  Wentworth ........................... 123/136
3,460,522  8/1969  Kittler et al. ........................... 123/136

OTHER PUBLICATIONS

An Adsorbtion–Regeneration Approach To The Problem of Evaporative Control–SAE 485 Lexington Avenue, N.Y. 17 N.Y.
Automotive Eng. Cong. Detroit, Mich. 1– 9– 13– 1967 No. 670127 (pages 1– 14)

*Primary Examiner*—Laurence M. Goodridge
*Attorney*—Cushman, Darby & Cushman

[57] ABSTRACT

An evaporative loss control device (ELCD) for automobiles is modified to provide a variable purging air rate and thereby improve the efficiency of the ELCD.

9 Claims, 3 Drawing Figures

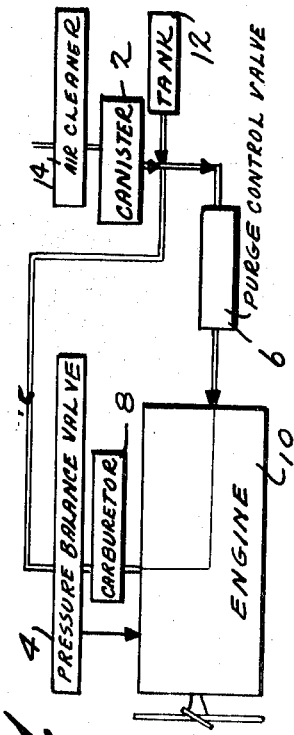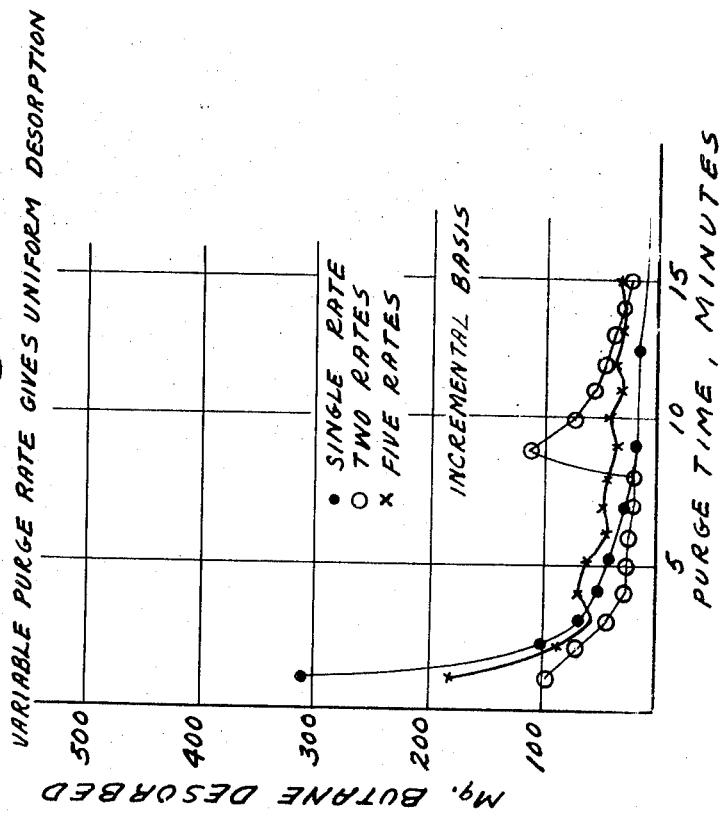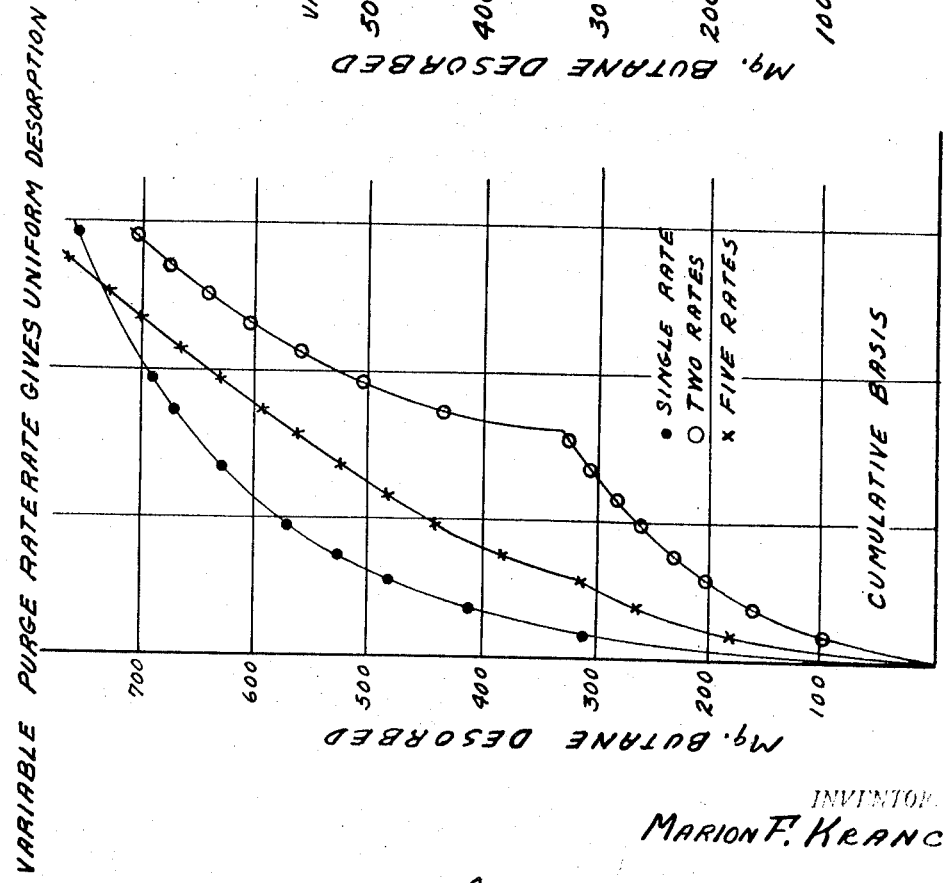

PURGING VOLATILES FROM GASOLINE STREAM

This application is a continuation-in-part of my application Ser. No. 632,626, filed Apr. 21, 1967, now abandoned, and a division of my application Ser. No. 655,973, filed June 8, 1967 now abandoned.

The present invention relates to the use of a fuel vapor recovery system (also called an Evaporative Loss Control Device, commonly abreviated ELCD).

The problem of evaporative emissions for automobile fuel systems is one of growing significance to the petroleum and automotive industries. As pointed out in Wentworth U.S. Pat. No. 3,093,124, the smog and pollution problem has directed attention to eliminating gasoline vapors which may escape from the fuel tank and carburetor float bowl. In addition the Motor Vehicle Pollution Control Board of California has proposed standards for the control of the evaporation losses, considering them to represent a sizable contribution to the smog problem. Further interest in controlling evaporative losses has been shown by the United States Government with the publication of proposed standards for such losses in the Federal Register.

As part of the means for eliminating the gasoline vapors Wentworth discloses the use of a canister filled with an adsorbent, e.g. activated carbon, for the volatile portions of the gasoline. Gasoline vapors given off by the engine fuel reservoir and the engine carburetor while the engine is not operating are recovered and retained in the canister and are subsequently released during engine operation, conducted to the engine and burned therein. This adsorption is accomplished by using the full flow of the engine air or a partial flow of the engine air through the adsorbent.

As explained in the Esso Research and Engineering Company Paper entitled "An Adsorption—Regeneration Approach to the Problem of Evaporative Control," presented at the Society of Automotive Engineers, Detroit, Michigan, Jan. 13, 1967, the basic evaporative loss control system has three essential components, (1) the canister containing the adsorbent for gasoline vapors, (2) the pressure balance valve, and (3) the purge control valve. The canister traps hydrocarbon vapors before they can escape to the atmosphere and holds them there until such time as they can be sent to the engine. The purpose of the pressure balance valve is to maintain metering forces in the carburetor exactly as they were originally designed while at the same time closing all external vents and routing hydrocarbon vapors from the carburetor bowl to the canister. The vapors from the fuel tank are also permitted to go to the canister. The function of the purge control valve is to allow the stripping of the hydrocarbon from the canister and the consequent feeding of the hydrocarbon laden purge air stream to the intake manifold. This is permitted to take place only under certain modes of engine operation.

Such an ELCD greatly reduces the emission of unburned hydrocarbons to the atmosphere. Thus the Motor Vehicle Pollution Control Board of California has proposed the following standards for the control of hydrocarbon evaporation losses, from the carburetor 2 grams per hot soak and 6 grams per day from the fuel tank as against normal operating conditions wherein 10 grams of hydrocarbons are lost per hot soak from the carburetor and 30 grams of hydrocarbons are lost per day from the fuel tank. By use of the ELCD Esso reduced the tank loss to 0 grams per day in three test cars and reduced the carburetor loss per hot soak to a range of 0.9 to 1.4 grams.

In the system described in Wentworth U.S. Pat. No. 3,093,124 the vapors given off of the carburetor float bowl and gasoline tank while the engine is off are captured in an adsorbent canister encircling the exhaust pipe. Each time the car is driven the canister will be heated and the adsorbent material purge off the trapped fuel vapors. In Wentworth U.S. Pat. No. 3,221,724 a fuel vapor recovery system is provided in which a low reactivating temperature adsorbent is used.

When the engine is off, vent lines from the carburetor float bowl and the fuel tank deliver raw gas vapor mixtures to the adsorbent where they are accepted and stored. When the engine is started the air sucked through the air intake and carburetor passes through and around the adsorbent bed bringing it to its reaction temperature, thus driving off the trapped fuel vapors. These vapors are carried off to the combustion chamber of the engine and burned.

The air to fuel ratio within the engine is desirably in the range of to 12–16 to 1. At present the problem is that no method has been devised for desorbing the lost hydrocarbon material from the canister containing activated carbon or the like and feeding it back to the intake system for combustion without causing an over-rich air-fuel mixture during the initial portion of the purge cycle. This results in such a rich mixture that engine performance is irregular and poor (i.e. hesitation; stumble) and CO content is increased. This is because of the rapid rate of hydrocarbon release during the first ten minutes of desorption.

Accordingly it is an object of the present invention to devise an improved method for desorbing volatiles from the canister of an ELCD.

Another object is to desorb volatile hydrocarbons from an ELCD and feed them back to the carburetor for combustion without causing a lean or rich gas-air mixture which would cause pollutants, e.g. gaseous hydrocarbons, from coming out of the exhaust pipe.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by employing a variable purging air rate of the gases adsorbed on the adsorbent, e.g. activated carbon, in the canister as disclosed in Wentworth or in the Esso brochure "Evaporative Loss Control Device" or in other devices of similar character.

The purge rate can be made either continuously variable, e.g. by the use of mechanical or electrical controlling means or the purging air rate can be varied by a plurality of specific incremental steps. Thus there can be two, three, four, five or more steps (a continuously changing purging air rate being in effect an infinite number of incremental steps). In most automobiles on the road today the purging air rate should be adjusted so that there is a difference between the beginning and a subsequent purge rate of at least double, e.g. if the initial purging air rate is 0.1 cfm. (cubic feet per minute) the subsequent purging air rate should be at least 0.2 cfm. and desirably the subsequent purging air rate is three, five or 10 times the initial purging air rate. Generally, the initial purging air rate is the lowest and subsequent purging air rates are at higher rates of purging air.

The purging air rates are adjusted to give as closely as possible an air to fuel ratio within the desired range of about 12–16 to 1.

When a plurality of purging air rates other than a continuously changing purging air rate is employed the change from one purging air rate to another is preferably done when the air to fuel ratio is between 15:1 and 16:1 although this can be varied.

In the following examples the adsorbent employed was Pittsburgh type BPX activated carbon (12 × 40 mesh U.S. Sieve Series) but there can also be used any other conventional activated carbon such as Pittsburgh type BPL (12 × 30 mesh), Pittsburgh type PCB (12 × 30 mesh), Pittsburgh type SGL, Barneby-Cheney (8 × 30 mesh), Nuchar (12 × 30 mesh), Darco (12 × 20 mesh), etc. as well as other adsorbents, e.g. molecular sieves. The preferred adsorbents are activated carbons.

Since the working capacity for different types of activated carbons and other adsorbents varies the purging air rate schedule in cfm. employed will be dependent upon the activated carbon. The schedule for any one carbon, however, can be obtained very conveniently, e.g. by saturating the activated carbon with the chosen hydrocarbon gas or mixture of gases and then observing the desorption rate at various rates of air flow through the carbon-containing canister.

The rates of air flow can also be adjusted to insure the desired desorption in any desired purge time, e.g. 5, 10, 15 or 20 minutes. Obviously, higher overall air flow rates are required for a purge in a time of 5 minutes than for the same amount of purge in 20 minutes. At average purge times of up to 20 minutes the ELCD is known to function for test cycles of 6 years without noticeable change in activated carbon capacity. The total air flow through the canister can be varied from 1.0 cfm. to full air flow into the engine.

The invention will be understood best in connection with the drawings wherein

FIG. 1 is a schematic diagram illustrating an evaporative loss control device according to the invention;

FIG. 2 is a graph showing the amount of purge on a cumulative basis; and

FIG. 3 is a graph showing the amount of purge on an incremental basis.

Referring more specifically to FIG. 1 which shows the fuel vapor recovery system there is provided an evaporative loss control device (ELCD) including a canister 2 containing activated carbon, a pressure balance valve 4 and a purge control valve 6. The system also includes the carburetor 8, engine 10, gasoline tank 12 and air cleaner 14.

In the purging condition of the ELCD the hydrocarbon vapors go in the direction indicated by the arrows, i.e. the hydrocarbons which have been adsorbed on the activated carbon in the canister gradually are desorbed and go through the purge control valve to the engine where they are burned. Gasoline vapor from the fuel tank bypasses the canister and also goes through the purge control valve to the engine intake manifold. Gasoline vapor in the carburetor goes through the pressure balance valve to the engine intake manifold. Air at a controlled, but varying rate is brought in from the outside through the canister and mixes with the hydrocarbons on the way to the purge control valve.

On the other hand in the hot soak condition, for example, gasoline vapors go from the fuel tank to the canister, but cannot go through the purge valve to the engine manifold. Similarly, gasoline vapors go from the carburetor through the pressure balance valve to the canister but are prevented from going to the engine manifold.

The ELCD operation for other conditions of engine mode is also like that set forth in the aforementioned Esso Research and Engineering Company bulletin.

Unless otherwise indicated all parts and percentages are by weight.

EXAMPLE 1

6.995 grams of BPX activated carbon in a tube was saturated with 1.924 grams of butane vapor at 25° C. From a previous experiment it was known that 300 mg. are removed in the first minute using an air stream rate of 150 ml.min. It was expected that this would be reduced to about 50 mg. by reducing the air flow rate to 25 ml./min. It was found, however, that the purging was more rapid than expected. Thus using a variable purging air rate according to the following air flow schedule at 25° C.

1 through 3 minutes, 25 ml. air/min.
4 through 6 minutes, 50 ml. air/min.
7 through 9 minutes, 75 ml. air/min.
10 through 12 minutes, 100 ml. air/min.
13 through 15 minutes, 150 ml. air/min., the results obtained in removal of hydrocarbon from the carbon are set forth in Table 1.

TABLE 1

| Total Time | Loss Per Minute | Loss Cumulative |
|---|---|---|
| After 1 Min. Purge | 182 mg. | 182 mg. |
| 2 | 82 | 264 |
| 3 | 49 | 313 |
| 4 | 68 | 381 |
| 5 | 60 | 441 |
| 6 | 40 | 481 |
| 7 | 43 | 524 |
| 8 | 38 | 562 |
| 9 | 32 | 594 |
| 10 | 37 | 631 |
| 11 | 30 | 661 |
| 12 | 38 | 699 |
| 13 | 28 | 727 |
| 14 | 31 | 758 |
| 15 | 27 | 785 |

EXAMPLE 2

A second experiment was made to demonstrate the effect of varying the purging air rate. The 6.995 grams of BPX activated carbon was saturated with 1.878 grams of butane at 25° C. Desorption was started at an air flow rate of 15 ml./min. at 25° C. with changes as noted in Table 2.

TABLE 2

| Air flow Rate | Time | Loss In Each Minute | Cumulative Loss |
|---|---|---|---|
| 15 ml./min. | 1 | 105 mg. | 105 mg. |
| " | 2 | 68 | 173 |
| " | 3 | 45 | 218 |
| " | 4 | 27 | 255 |
| " | 5 | 30 | 285 |
| 30 ml./min. | 6 | 43 | 328 |
| " | 7 | 35 | 363 |
| " | 8 | 29 | 392 |
| 120 ml./min. | 9 | 83 | 475 |
| " | 10 | 56 | 531 |
| " | 11 | 46 | 577 |
| 150 ml./min. | 12 | 49 | 626 |
| " | 13 | 41 | 667 |
| " | 14 | 31 | 698 |
| " | 15 | 32 | 730 |

This procedure gives essentially two significant peaks during the desorption cycle and is preferable to only one peak.

EXAMPLE 3

6.995 grams of BPX activated carbon were saturated with 1.865 grams of butane at 25° C. Purging was carried out at 25° C. with two air flow rates — 15 ml./min. for the first 8 minutes and 150 ml./min. for the next 7 minutes. The results are set forth in Table 3.

TABLE 3

| Time | Loss In Each Minute | Cumulative Loss |
|---|---|---|
| 1 | 98 mg. | 98 mg. |
| 2 | 72 | 160 |
| 3 | 42 | 204 |
| 4 | 28 | 232 |
| 5 | 28 | 260 |
| 6 | 23 | 283 |
| 7 | 21 | 304 |
| 8 | 16 | 320 |
| 9 | 114 | 434 |
| 10 | 70 | 504 |
| 11 | 58 | 562 |
| 12 | 44 | 606 |
| 13 | 36 | 642 |
| 14 | 29 | 671 |
| 15 | 30 | 701 |

EXAMPLE 4

An automobile containing an ELCD had 910 grams of BPX activated carbon in its canister and was saturated with volatile hydrocarbon (butane). The automobile was run at 30 miles per hour and 15 cfm. of air were introduced — 14 cfm. through the carburetor throat and 1 cfm. through the canister of the ELCD. The hydrocarbons were purged at 25° C. in the manner set forth in Table 4.

TABLE 4

| Time | Loss In Each Minute |
|---|---|
| 1 | 40.9 grams |
| 2 | 13.3 |

| | |
|---|---|
| 3 | 8.8 |
| 4 | 6.7 |
| 5 | 5.6 |
| 6 | 4.5 |
| 7 | 3.3 |
| 8 | 3.4 |
| 9 | 2.4 |
| 10 | 2.5 |
| 11–15 | 1.7 (average) |
| 16–20 | 1.2 (average) |

15 cubic feet of air at 25° C. is 475 grams of air (at 25° C. one cubic foot of air weighs 31.7 grams). The 14 cf. of air passing through the carburetor evaporated 27.7 grams of fuel per minute at a 16:1 air to fuel ratio. The results of operating the car with this single purging air rate are set forth in Table 5.

TABLE 5

| Time (Min.) | Fuel From Carburetor | Fuel From Canister | Total Fuel | Air To Fuel Ratio |
|---|---|---|---|---|
| 1 | 27.7 g. | 40.9 g. | 68.6 g. | 6.9 |
| 2 | 27.7 | 13.3 | 41.0 | 11.6 |
| 3 | 27.7 | 8.8 | 36.5 | 13.0 |
| 4 | 27.7 | 6.7 | 34.4 | 13.8 |
| 5 | 27.7 | 5.6 | 33.3 | 14.3 |
| 6 | 27.7 | 4.5 | 32.2 | 14.8 |
| 7 | 27.7 | 3.3 | 31.0 | 15.3 |
| 8 | 27.7 | 3.4 | 31.1 | 15.3 |
| 9 | 27.7 | 2.4 | 30.1 | 15.8 |
| 10 | 27.7 | 2.5 | 30.2 | 15.7 |
| 11–15 | 27.7(avg.) | 1.7(avg.) | 29.4(avg.) | 16.2 (avg.) |
| 16–20 | 27.7(avg.) | 1.2(avg.) | 28.9(avg.) | 16.5 (avg.) |

Ultimately when the canister is completely purged the air to fuel ratio is 17.2 to 1.

EXAMPLE 5

The same car was employed as in Example 4. The ELCD had 910 grams of BPX activated carbon in its canister and was saturated with volatile hydrocarbon (butane). The automobile was run at 30 miles per hour. 14.9 cfm. of air were introduced through the carburetor throat and 0.1 cfm. was introduced through the canister for the first 8 minutes and then for the next 7 minutes 14.0 cfm. of air were introduced through the carburetor and 1 cfm. of air was introduced through the canister. The hydrocarbons were purged at 25° C. The results of operating the car with this double purging air rate are set forth in Table 6.

TABLE 6

| Time (Min.) | Fuel From Carburetor | Fuel From Canister | Total Fuel | Air to Fuel Ratio |
|---|---|---|---|---|
| 1 | 29.6 grams | 12.7 grams | 42.3 grams | 11.2 |
| 2 | 29.6 | 9.4 | 39.0 | 12.2 |
| 3 | 29.6 | 5.4 | 35.0 | 13.6 |
| 4 | 29.6 | 3.6 | 33.2 | 14.3 |
| 5 | 29.6 | 3.6 | 33.2 | 14.3 |
| 6 | 29.6 | 3.0 | 32.6 | 14.6 |
| 7 | 29.6 | 2.7 | 32.3 | 14.7 |
| 8 | 29.6 | 2.1 | 31.7 | 15.1 |
| 9 | 27.7 | 14.8 | 42.5 | 11.2 |
| 10 | 27.7 | 9.1 | 36.8 | 12.9 |
| 11 | 27.7 | 7.6 | 35.3 | 13.5 |
| 12 | 27.7 | 5.7 | 33.4 | 14.2 |
| 13 | 27.7 | 4.6 | 32.3 | 14.7 |
| 14 | 27.7 | 3.7 | 31.4 | 15.2 |
| 15 | 27.7 | 3.9 | 31.6 | 15.1 |

Ultimately when the canister is completely purged the air to fuel ratio is 17.2 to 1.

FIG. 2 is a graph with the milligrams of butane desorbed as the ordinate and the cumulative purge time in minutes as the abscissa for desorbing 6.995 grams of BPX activated carbon initially saturated with the butane. The single rate curve was for an air flow of 1 cfm. The two rate curve was for an air flow of 0.1 cfm. for 8 minutes and an air flow of 1 cfm. for the next 7 minutes. The five rate curve was for an air flow of 0.16 cfm. for the first 3 minutes, an air flow of 0.33 cfm. for minutes 4–6, an air flow of 0.50 cfm. for minutes 7–9, an air flow of 0.67 cfm. for minutes 10–12 and an air flow of 1 cfm. for minutes 13–15.

FIG. 3 is a graph for the same three systems of purging as set forth in connection with FIG. 2. In FIG. 3 the milligrams of butane desorbed is the ordinate and the purge time on an incremental basis for each minute as the abscissa.

It can be seen from the graphs that the variable purging air rates gives a more uniform desorption than the single purging air rate.

What is claimed is:

1. In a method of preventing the escape of fuel vapors within an engine to the atmosphere in which the vapors created incident to engine shut-down are directed to an adsorbent where they are adsorbed and during a predetermined time period within a range of from five to twenty minutes of continuous normal operation of said engine after start-up a portion of the total engine air intake flow, which portion varies proportionally with variations in the total engine air intake flow due to variations in the normal operation thereof, is directed through the adsorbent to desorb the fuel vapor adsorbed thereby, the air directed through the adsorbent and the desorbed fuel vapor entrained therein forming a portion of the total air used to support combustion and the fuel combusted during said period of operation, the improvement which comprises the steps of varying the proportion of the total air intake flow directed through said adsorbent during said period of operation from an initial minimum proportion to a final maximum proportion so as to establish a flow therethrough which varies from an initial minimum rate to a final maximum rate at least five times said initial rate irrespective of the aforesaid proportional variations thereof, the varying flow rates being sufficient to (1) substantially completely desorb said adsorbent of substantially saturated fuel vapor within said predetermined period of operation and (2) to maintain the ratio of the air used to support combustion and the fuel combusted within an air-fuel ratio range sufficient to prevent hesitation and stumble during the operation of the engine within said predetermined period, said minimum rate of flow being insufficient to substantially completely desorb said adsorbent of substantially saturated fuel vapor within said predetermined period of operation when maintained constantly throughout, said maximum rate of flow being sufficient to substantially completely desorb said adsorbent of substantially saturated fuel vapor in less than said predetermined time period of operation when maintained constantly throughout but insufficient to maintain the ratio of the air used to support combustion and the fuel combusted above a value which will prevent hesitation and stumble in the operation of the engine during said predetermined period.

2. A method as defined in claim 1 wherein the variation from said initial minimum proportion to said final maximum proportion is accomplished by a continuous increase in the proportion of the total air intake flow directed through said adsorbent.

3. A method as defined in claim 1 wherein said final maximum rate is at least 10 times said initial minimum rate.

4. A method as defined in claim 1 wherein said initial minimum rate is not more than 0.1 cfm.

5. A method as defined in claim 4 wherein said final maximum rate is approximately 10 times said initial minimum rate.

6. A method as defined in claim 1 wherein said predetermined time period is at least 10 minutes.

7. A method as defined in claim 6 wherein the flow of air established through said adsorbent is varied so that the amount of desorbed fuel vapors in the first minute is not more than 182/631 of the total amount of desorbed fuel vapors in the first 10 minutes of the operation of the engine within said predetermined period.

8. A method as defined in claim 7 wherein said predetermined time period is approximately 15 minutes.

9. A method as defined in claim 1 wherein the adsorbent is activated carbon.

* * * * *